US007223713B2

(12) United States Patent
Alonso et al.

(10) Patent No.: US 7,223,713 B2
(45) Date of Patent: May 29, 2007

(54) MOLYBDENUM SULFIDE/CARBIDE CATALYSTS

(75) Inventors: Gabriel Alonso, Chihuahua (MX); Russell R. Chianelli, El Paso, TX (US); Sergio Fuentes, Ensenada (MX); Brenda Torres, El Paso, TX (US)

(73) Assignees: Board of Regents, The University of Texas System, Austin, TX (US); Centro de Investigacion en Materiales Avanzados, S.C., Chihuahua (MX)

( * ) Notice: Subject to any disclaimer, the term of this patent is extended or adjusted under 35 U.S.C. 154(b) by 151 days.

(21) Appl. No.: 10/819,893

(22) Filed: Apr. 7, 2004

(65) Prior Publication Data

US 2005/0059545 A1    Mar. 17, 2005

Related U.S. Application Data

(60) Provisional application No. 60/460,862, filed on Apr. 7, 2003.

(51) Int. Cl.
*B01J 27/22* (2006.01)
*B01J 27/24* (2006.01)
(52) U.S. Cl. .................. 502/177; 502/180; 502/182; 502/183; 502/184; 502/185
(58) Field of Classification Search ............ 502/177, 502/180, 182, 183, 184, 185
See application file for complete search history.

(56) References Cited

U.S. PATENT DOCUMENTS

| | | | |
|---|---|---|---|
| 687,842 A | 12/1901 | Linney | |
| 4,243,553 A | 1/1981 | Naumann et al. | 252/439 |
| 4,243,554 A | 1/1981 | Naumann et al. | 252/439 |
| 4,279,737 A | 7/1981 | Chianelli et al. | 208/217 |
| 4,431,747 A | 2/1984 | Seiver et al. | 502/220 |
| 4,480,677 A | 11/1984 | Henson et al. | 164/46 |
| 4,508,847 A | 4/1985 | Chianelli et al. | 502/200 |
| 4,514,517 A | 4/1985 | Ho et al. | 502/220 |
| 4,528,089 A | 7/1985 | Pecoraro et al. | 208/216 R |
| 4,581,125 A | 4/1986 | Stiefel et al. | 208/108 |
| 4,650,563 A | 3/1987 | Jacobson et al. | 208/108 |
| 4,820,677 A | 4/1989 | Jacobson et al. | 502/220 |
| 4,826,797 A * | 5/1989 | Chianelli et al. | 502/221 |
| 4,839,326 A | 6/1989 | Halbert et al. | 502/220 |
| 4,880,761 A | 11/1989 | Bedard et al. | 502/215 |
| 4,902,404 A * | 2/1990 | Ho | 208/57 |
| 5,010,049 A | 4/1991 | Villa-Garcia et al. | 502/60 |
| 5,057,296 A | 10/1991 | Beck | 423/277 |
| 5,094,991 A | 3/1992 | Lopez et al. | 502/219 |
| 5,102,643 A | 4/1992 | Kresge et al. | 423/328 |
| 5,565,142 A | 10/1996 | Deshpande et al. | 252/315.2 |
| 5,872,073 A | 2/1999 | Hilsenbeck et al. | 502/220 |
| 6,156,693 A | 12/2000 | Song et al. | 502/220 |
| 6,299,760 B1 | 10/2001 | Soled et al. | 208/254 H |
| 6,451,729 B1 * | 9/2002 | Song et al. | 502/220 |

FOREIGN PATENT DOCUMENTS

CA    680160    2/1964

OTHER PUBLICATIONS

Alonso et al., "Preparation of MoS$_2$ and WS$_2$ catalysts by in situ decomposition of ammonium thiosalts," *Catalysis Letters*, 52:55-61, 1998.
Alonso et al., "Preparation of MoS$_2$ and WS$_2$ catalysts by in situ decomposition of ammonium thiosalts," *Catalysis Today*, 43:117-122, 1998.
Alonso et al., "Synthesis and characterization of tetraalkylammonium thiomolybdates and thiotungstates in aqueous solution," *Inorg. Chim. Acta*, 274:108-110, 1998.
Alonso et al., "Synthesis and characterization of tetraalkylammonium thiomolybdates and thiotungstates in aqueous solution," *Inorg. Chim. Acta*, 316:105-109, 2001.
Alonso et al., "Synthesis of tetraalkylammonium thometallates in aqueous solution," *Inorg. Chim. Acta*, 325:193-197, 2001.
Alonso et al., "Molybdenum disulfide catalysts by 'in situ' decomposition of thiosalt precursurs," *17th North American Catalysis Society Meeting*, Ontario, Canada, Jun. 3-8, 2001.
Atkinson et al., "Fundamental aspects of hot isostatic pressing: an overview," *Metallurgical and Materials Transactions A*, 31A:2981, 2000.
Beck et al., "A new family of mesoporous molecular sieves prepared with liquid crystal templates," *J. Am. Chem. Soc.*, 114:10834-10843, 1992.
Brito et al., "Thermal and reductive decomposition of ammonium thiomolybdates," *Thermochimica Acta*, 256:325, 1995.
Brownlee, *Statistical Theory and Methodology in Science and Engineering*, 2nd Ed., Wiley, NY, 590, 1965.
Chianelli et al., "Symmetrical synergism and the role of carbon in transition metal sulfide catalytic materials," *Catalysis Today*, 53:357-366, 1999.
Chianelli et al., "Low-temperature solution preparation of group 4B, 5B, and 6B transition-metal dichalcogenides," *Inorg Chem.*, 17(10):2758, 1978.

(Continued)

*Primary Examiner*—Elizabeth D. Wood
(74) *Attorney, Agent, or Firm*—Fulbright & Jaworski L.L.P.

(57) ABSTRACT

The present invention provides methods of synthesizing molybdenum disulfide (MoS$_2$) and carbon-containing molybdenum disulfide (MoS$_{2-x}$C$_x$) catalysts that exhibit improved catalytic activity for hydrotreating reactions involving hydrodesulfurization, hydrodenitrogenation, and hydrogenation. The present invention also concerns the resulting catalysts. Furthermore, the invention concerns the promotion of these catalysts with Co, Ni, Fe, and/or Ru sulfides to create catalysts with greater activity, for hydrotreating reactions, than conventional catalysts such as cobalt molybdate on alumina support.

23 Claims, 4 Drawing Sheets

OTHER PUBLICATIONS

Chianelli et al., "Amorphous and poorly cryatalline transition metal chalcogenides," *International Reviews in Physical Chemistry*, 2:127, 1982.

Nonprovisional application claiming priority to U.S. Appl. No. 60/460,951, entitled "Preparation of amorphous sulfide sieves," and shares inventors Chianelli and Alonso.

Corelis, "Uber die schwefelverbindungen des wolframs," *Ann. Chem.*, 232:244, 1886.

Cramer et al., "The molybdenum site of nitrogenase, 2. A comparative study of Mo-Fe proteins and the iron-molybdenum cofactor by X-ray absorption spectroscopy," *J. Am. Chem. Soc.*, 100:3814, 1978.

EPA Regulatory Announcement EPA420-F-00-057, Dec. 2000.

*Federal Register*, "Control of air pollution from new motor vehicles: tier 2 motor vehicle emissions standards and gasoline sulfur control requirements," 65(28):6701, 2000.

Frommell et al., "An x-ray diffraction and ESCA study of the transformation of ammonium tetrathiomolybdate to $MoS_2$," In: Proc. 12th North American Meeting of Catalytic Soc., Lexington, KY, PD-38, 1991.

Frye et al., "Kinetics of hydrodesulfurization," *Chem. Eng. Prog.*, 63:66, 1967.

Fuentes et al., "The influence of a new preparation and method on the catalytic properties of CoMo and NiMo sulfides," *J. Catal.*, 113:535-539, 1988.

Girgis et al., "Reactivities, reaction networks, and kinetics in high-pressure catalytic hydroprocessing," *Ind. Eng. Chem. Res.*, 30:2021, 1991.

Houalla et al., "Hydrodesulfurization of methyl-substituted debenzothiophenes catalyzed by sulfided C0-Mo/γ-$Al_2O_3$," *J. Catal.*, 61:523, 1980.

Inamura et al., "The role of Co in unsupported Co-Mo sulfides in the hydrodesulfurization of thiophene," *J. Catal.*, 147:515-524, 1994.

Iwata et al., "Catalytic functionality of unsupported molybdenum sulfide catalysts prepared with different methods," *Cat. Today*, 45:353-359, 1998.

Jiang et al., "Synthesis and structure of microporous layered tin (IV) sulfide materials," *J. Mater. Chem.*, 8:721-732, 1998.

Kistler, "Coherent expanded aerogels and jellies," *Nature*, 127:741, 1931.

Kresge et al., "Ordered mesoporous molecular sieves synthesized by a liquid-crystal template mechanism," *Nature*, 359:710-712, 1992.

Land et al., "Processing of low-density silica gel by critical pint drying or ambient pressure drying," *J. Non-Cryst. Solids*, 283:11, 2001.

Laudise, In: *The Growth of Single Crystals*, 278-281, Prentice-Hall, Englewood Cliffs, NJ, 1970.

Leist et al., "Semiporous MoS2 obtained by the decomposition of thiomolybdate precursors," *J Mater. Chem.*, 8:241, 1998.

Liang et al., "Structure of poorly crystalline $MoS_2$-a modeling study," *J. Non-Crystalline Solids*, 79:251-273, 1986.

Lobachev, In: *Crystallization Processes under Hydrothermal Conditions*, Consultants Bureau, NY 1973.

Ma et al., "A review of zeolite-lie porous materials," *Microporous and Mesoporous Materials*, 37:243-252, 2000.

McDonald et al., "Syntheses and characterization of ammonium and tetraalkylammonium thiomolybdates and thiotungstates," *Inorg. Chem Acta*, 72:205-210, 1983.

Morey and Niggli, "The hydrothermal formation of silicates, a review," *J. Am. Chem. Soc.*, 35(9):1086-1130, 1913.

Müller and Newton, In: *Nitrogen Fixation: Chemical, Biochemical, Genetics Interfaces*, Plenum Press, NY, 1982.

Müller, In: *Transition Metal Chemistry-Current Problems of General, Biological and Catalytical Relevances*, Verlag Chemie, Weinheim, 1981.

Nava et al., "Cobalt-molybdenum sulfide catalysts prepared by in situ activation of bimetallic (Co-Mo) alkylthiomolybdates," Catalysts Leters, 86(4):2003.

Pan et al., "Facile synthesis of new molybdenum and tungsten sulfido complexes. Structure of $Mo_3S_9^{2-}$," *Inorg. .Chem.*, 22:672-678, 1983.

Prasad et al., "Thermal decomposition of $(NH_4)_2MoO_2S_2$, $(NH_4)_2MoS_4$, $(NH_4)_2WO_2S_2$ and $(NH_4)_2WS_4$," *J. Inorg. Nucl. Chem.*, 35:1895-1904, 1973.

Rabenau, "The role of hydrothermal synthesis in preparative chemistry," *Angew. Chem.*, (English Ed.), 24:1026-1040, 1985.

Ramanathan et al., "Characterization of tungsten sulfide catalysts," *J. Catal.*, 95:249-259, 1985.

Roy, "Accelerating the kinetics of low-temperature inorganic syntheses," *J. Solid State Chem.*, 111:11-17, 1994.

Smith et al., "Shrinkage during drying of silica gel," *J. Non-Cryst. Solids* 188:191, 1995.

Swain, "U.S. refiners face declining crude quality, insufficient price spread," *Oil & Gas J.*, 1:62-65,1993.

*Hydrotreating Catalysis-Science and Technology*, Springer, Anderson and Boudart eds., 1996.

Vasudevan et al., "Characterization of supported molybdenum sulfide catalyst ex ammonium tetrathiomolybdate," *Appl. Catal.*, 112:161-173, 1994.

Vrinat et al., "A comparison of some catalytic properties of unsupported $MoS_2$ and $WS_2$ catalysts promoted by group VIII metals," *Bull. Soc. Chim. Belg.*, 93:637, 1984.

Waldron et al., *Sintering*, Heyden, London, p. 62, 1978.

Wasielewski et al., "Elimination of casting defects using HIP," *Proc 2nd Int. Conf. Superalloys Processing*, TMS-AIME, Champion, PA, pp. D-1-D-24, 1972.

Weisser et al., In: *Sulphide Catalysts: Their Properties and Applications*, Pergamon Press, NY, 1973.

Wilkinson et al., "Characterization of supported tungsten sulfide catalysts ex ammonium tetrathiotungstate," *J. Catal.*, 171:325-328, 1997.

Yoshimura and Suda, "Hydrothermal processing of hydroxyapatite: past, present, and future," In: *Hydroxyapatite and Related Materials*, Brown and Constanz (Eds), 45-72, CRC Press, Inc., 1994.

Zhang et al., "TPD and HYD studies of unpromoted and co-promoted molybdenum sulfide catalyst ex ammonium tetrathiomolybdate," *J. Catal.*, 157:53, 1995.

Borelis, "Uber die schwefelverbindungen des wolframs," *Ann. Chem.*, 232:244, 1886.

Kruss, "Uber die schwelverbindungen des molybdäns," *Ann. Chem.*, 225:1, 1884.

* cited by examiner

CHEMICAL ANALYSIS

MOLYBDENUM SULFIDE/CARBIDE CATALYSTS

The present application claims the benefit of U.S. Provisional Application Ser. No. 60/460,862 filed on Apr. 7, 2003. The entire text of the above-referenced disclosure is herein incorporated by reference.

The U.S. government may own rights in the present invention pursuant to grant numbers DE-FC04-01AL67097 from the U.S. Department of Energy.

BACKGROUND OF THE INVENTION

1. Field of the Invention

The present invention relates generally to catalysts. In particular, the present invention relates to methods and compositions concerning molybdenum disulfide ($MoS_2$) and carbon-containing molybdenum disulfide ($MoS_{2-x}C_x$) catalysts with novel nanostructures that exhibit improved catalytic activity for hydrotreating reactions involving hydrodesulfurization, hydrodenitrogenation, and hydrogenation.

2. Description of Related Art

Hydrotreating processes are well known to the petroleum refining industry. These processes involve treating various hydrocarbon feeds with hydrogen in the presence of catalysts to lower the molecular weight of the hydrocarbons or to remove or to suitably alter the unwanted components. Hydrotreating may be applied to a variety of feedstock such as solvents, distillate feeds (light, middle, heavy), residual feeds, and fuels. In the treatment of catalytic cracking feedstock, the cracking quality of the feedstock is improved by the hydrogenation. For example, carbon yield may be reduced in order to increase gasoline yield.

When hydrotreating is used to remove unwanted compounds (e.g., sulfur, nitrogen, aromatics), unsaturated hydrocarbons are hydrogenated, and the saturated sulfur and nitrogen are removed. In the hydro-desulfurization of relatively heavy feedstock, emphasis is on the removal of sulfur from the feedstock, which is usually converted into lower molecular weight or lower boiling point components. In the hydrodesulfurization of heavier feedstock, or residues, the sulfur compounds are hydrogenated and cracked. Carbon-sulfur bonds are broken, and the sulfur for the most part is converted to hydrogen sulfide which can be removed as a gas from the process. Similarly, hydrodenitrogenation involves hydrogenating and cracking heavier feedstock or residues in order to remove nitrogen. Carbon-nitrogen bonds are broken, and the nitrogen is converted to ammonia and evolved from the process. In the hydrodenitrogenation of relatively heavy feedstock emphasis is on the removal of nitrogen from the feedstock, which is also converted to lower molecular weight or lower boiling point components.

The dwindling supplies of high grade petroleum feedstock necessitates the increased production and processing of transportation fuels from lower grade, heavy petroleum feedstock and synthetic liquid hydrocarbons derived from hydrocarbon-containing, or precursor hydrocarbon-containing solids. The refiners' feedstock sources as a result thereof continue to change, particularly as the worldwide supplies of petroleum diminish. The newer feedstock often contain higher amounts of nitrogen, sulfur, and other materials. Nonetheless, whatever the difficulties, it remains a necessity to effectively hydrotreating the new low quality feedstock often to a greater extent than was previously required due to more stringent regulations. In addition, these low-grade feeds with their high concentrations of sulfur, nitrogen, and aromatics cause activity suppression and an all too rapid deactivation of currently known catalysts. Coke formation is increased, which thus requires more cracking in order to achieve increased gas production.

Accordingly, considerably more upgrading is required to obtain usable products from these sources. Such upgrading generally necessitates hydrotreating the various hydrocarbon fractions, or whole crudes, and includes reactions such as hydrogenating to saturate olefins and aromatics, hydrodesulfurizing to remove sulfur compounds, hydrodenitrogenating to remove nitrogen, and conversion of high boiling compounds to lower boiling compounds.

Conventional hydrotreating catalysts include molybdenum disulfides ($MoS_2$) promoted with nickel or cobalt, and they may be unsupported or supported (e.g., on alumina). The Co and Ni act as promoters for increasing hydrotreatment activity. In the following paragraphs, some conventional catalyst solutions of this general type are presented.

U.S. Pat. No. 4,243,554 to Naumann et al. ("Naumann") teaches that cobalt and nickel promoted molybdenum disulfide catalysts with relatively high surface areas may be obtained through thermal decomposition of various ammonium thiomolybdate salts such as an ammonium salt of a molybdenum-sulfur cluster anion or an ammonium thiomolybdate salt having the formula $(NH_4)_2[MoO_xS_{4-x}]$, where x is 2. The decomposition of these thiosalts is carried out with sulfur-containing organic compounds in a hydrocarbon solution, pressurized with hydrogen at temperatures of about 300–800° C.

U.S. Pat. No. 4,508,847 to Chianelli et al. discloses a carbon-containing $MoS_2$ catalyst. The carbon-containing molybdenum sulfide catalysts are obtained by contacting one or more catalyst precursors selected from (a) ammonium thiomolybdate or thiotungstate salts, (b) ammonium molybdate or tungstate salts, (c) substituted ammonium thiomolybdate or thiotungstate salts, (d) substituted ammonium molybdate or tungstate salts, and mixtures thereof, with sulfur, hydrogen and a hydrocarbon at a temperature broadly ranging from about 150 to 600° C. This produces catalysts that have the general formula $MS_{2-z}C_{z'}$ wherein $0.01 \leq z \leq 0.5$ and $0.01 \leq z' \leq 3.0$. These catalysts have surface areas of up to about 350–400 $m^2/gm$. They can be promoted with one or more promoter metals such as cobalt. Such promotion produces catalysts having hydrorefining activity that is greater than that of prior cobalt molybdate on alumina hydrorefining catalysts.

U.S. Pat. No. 4,431,747 to Seiver et al. teaches a similar $MoS_2$ catalyst. Seiver discloses supported carbon-containing molybdenum and tungsten sulfide hydrotreating catalysts, both promoted and unpromoted species, having high activity, selectivity, and stability especially in conducting hydrodesulfurization and hydrodenitrogenation reactions. In accordance therewith, a supported carbon-containing molybdenum sulfide and tungsten sulfide hydrotreating catalyst is formed by compositing a preselected quantity of a porous, refractory inorganic oxide with a complex salt characterized by the formula $B_x[MO_yS_{4-y}]$, where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3. A solution of the salt, or admixture of salts, is incorporated with a preselected quantity of a porous, refractory inorganic oxide support such as a particulate mass of the support. The salt-containing support is then dried to remove all or a portion of the solvent from the support, and the dried particulate salt-containing support is then heated in the presence of hydrogen, hydrocarbon, and sulfur or a sulfur-bearing compound to the decomposition temperature of the salt, or salts, to form the catalyst.

U.S. Pat. Nos. 4,528,089 and 4,650,563 also disclose carbon-containing molybdenum sulfide catalysts. The catalysts are formed by heating one or more precursor salts in the presence of sulfur and under oxygen-free conditions. The salts contain a thiometallate anion of Mo, W, or a mixture thereof and a cation that includes one or more promoter metals. The promoter metals are chelated by at least one neutral, nitrogen-containing polydentate ligand, with the promoter metal being Ni, Co, Zn, Cu or a mixture thereof. The precursor salts have the general formula, $ML(Mo_yW_{1-y}S_4)$ where M is one or more divalent promoter metals such as Ni, Co, Zn, Cu or a mixture thereof. Y is any value ranging from 0 to 1, and L is one or more, neutral, nitrogen-containing ligands with at least one being a chelating polydentate ligand. Ideally, M is Co, Ni, or a mixture thereof, and the ligand, L, has a denticity of six and is either three bidentate or two tridentate chelating ligands. It is claimed that these catalysts have hydrotreating or hydrorefining activities substantially greater than those of catalysts derived from conventional hydrotreating catalyst precursors such as cobalt molybdate on alumina, even though their surface areas are not as high.

U.S. Pat. Nos. 4,581,125 and 4,514,517 disclose molybdenum disulfide catalysts that can be obtained by heating one or more carbon-containing, bis (tetrathiometallate) catalyst precursor salts selected from $(NR_4)_2[M(WS_4)_2]$ or $(NR_4)_x[M(MoS_4)_2]$ groups in a non-oxidizing atmosphere in the presence of sulfur and hydrogen at a temperature above about 150° C. for a time sufficient to form the catalyst. The $(NR_4)$ is a carbon-containing, substituted ammonium cation and R is either: (a) an alkyl group, aryl group, or mixture thereof, or (b) a mixture of (a) with hydrogen. Promoter metal, M, is covalently bound in the anion and is Ni, Co, or Fe. X is 2 if M is Ni, and x is 3 if M is Co or Fe. It is taught that the catalyst should ideally be formed in the presence of a hydrocarbon.

U.S. Pat. No. 4,839,326 discloses a catalyst formed by treating molybdenum sulfide- or tungsten sulfide-containing materials supported with an organometallic complex containing a transition metal promoter such as Co, Fe, and Ni. Similarly, U.S. Pat. No. 4,820,677 teaches a catalyst formed from an amorphous sulfide of iron and a metal selected from Mo, W, and mixtures thereof, along with a metal sulfide of at least one metal that has Co, Ni, Mn, Zn, Cu or a mixture thereof. The resulting catalyst is an amorphous sulfide of a mixture of iron with molybdenum and/or tungsten and, optionally, a mixture of the amorphous sulfide with a metal sulfide of one or more additional metals such as Ni, Co, Mn, Zn, and Cu.

U.S. Pat. No. 4,279,737 discloses chalcogenides that are superior catalysts for the treatment of hydrocarbons. They have the general formula, $MX_y$, where M is ruthenium, osmium, rhodium, or iridium, X is sulfur, selenium, tellurium, or a mixture thereof, and y is a number ranging from about 0.1 to about 3. The catalysts are prepared through a low temperature, nonaqueous precipitation technique.

Song et al., U.S. Pat. No. 6,156,693, teaches a method for preparing $MoS_2$ catalysts by decomposing ammonium tetrathiomolybdate (ATTM) precursors dissolved in a solution of relatively high boiling point solvent (n-tridecane, boiling point=234° C.) and added $H_2O$ under $H_2$ pressure at 350–400° C. The reference teaches that the $MoS_2$ produced from ATTM and $H_2O$ at 350–400° C. has higher surface areas (286–335 m²/g) than those from ATTM without water, which have surface areas of 54–70 m²/g. Song teaches that the surface area of $MoS_2$ prepared at 375° C. from ATTM and water is 342 m²/g, which is about three times that of $MoS_2$ from ATTM without water (70 m²/g). It was also recognized that while water is effective for generating highly active catalyst, it actually impairs the catalytic conversion process itself. Therefore, the reference teaches that the water should be removed after ATTM decomposition to yield a more active $MoS_2$ catalyst.

Finally, U.S. Pat. No. 6,299,760 discusses the production of unsupported molybdenum-containing catalysts; however, the method employed is different and the result catalyst is different.

In addition to these discoveries, several researchers have identified some general principles relating to the decomposition of ATM into molybdenum disulfide. For example, the decomposition of ammonium and amine thiosalts for creating molybdenum catalysts has been reported by Alonso et al., 1998a; Alonso et al., 1998b. These references teach that the decomposition of ATM (ammoniumthiomolybdate) at relatively low temperatures (e.g., 623 K) and high pressure (e.g., 3.1 MPa) hydrogen environment can produce a very disordered $MoS_2$ structure with large surface areas and higher catalytic activity. Also, for non-mechanically pressed decomposition, the surface area and catalytic activity will increase with increase of bulkiness in the alkyl radical. In addition, it was confirmed that in situ decomposition results in more active catalysts than ex situ decomposition. Similarly, in Brito et al., (1995), it was reported that the overall thermal decomposition of ammonium thiomolybdate (ATM) to molybdenum disulfide in inert atmospheres generally occurs over a wide temperature range of 120–820° C. Initially, molybdenum trisulfide is formed between 120 and 260° C., and then $MoS_2$ forms in the remaining range of between 300 to 820° C. While most of the reaction will occur in the range from 300 to 500° C., temperatures exceeding 800° C. are required to remove the remaining sulfer and achieve stoichiometric $MoS_2$. However, hydrogen can be used to accelerate the decomposition of $MoS_3$ to $MoS_2$. In the presence of hydrogen, stoichiometric $MoS_2$ can be formed at temperatures lower than 450° C.

Catalysts exist for the hydrotreating processes. However, a need exists for more efficient catalysts such as those provided by the present invention.

The processes and catalysts presented herein are very useful for hydrotreating reactions involving hydrosulfurization, hydrodenitrogenation and hydrogenation. These catalysts are useful in oil refining and production of petrochemical compounds.

The catalysts may be compacted and provided in a pellet form. This form may reduce the adsorption of water in the active catalyst.

SUMMARY OF THE INVENTION

The present invention includes several methods, including two methods (METHODS A AND B), for making molybdenum disulfide ($MoS_2$) and carbon-containing molybdenum disulfide ($MoS_{2-x}C_x$) catalysts showing improved surface area for hydrotreating processes. The invention also includes the resulting catalysts. The catalysts are formed from precursor salts generally having the formula, $A_xMoS_4$, where A is an ammonium or tetraalkyl ammonium ion (x is 2 for such cases) or a diamine ion (x is 1 in this case). The resulting molybdenum disulfide can be used alone or as a support for a promoter such as cobalt, ruthenium, iron, or nickel. The $MoS_2$ materials are formed in solutions that can be aqueous or a mixture of aqueous and organic components under hydrothermal conditions. Thus, the term "solution," as used herein, means water and/or a mixture of water and other components.

More generally, the invention may involve catalysts with the following formula: $Mo_{1-y}W_yS_{2-x}C_x$ with $0 \leq y \leq 1$ and $0 \leq x \leq 1$. Thus, the terms "molybdenum disulfide catalyst" and "$MoS_2$ catalyst," as used herein, include catalysts with the formula $Mo_{1-y}W_yS_{2-x}C_x$ with $0 \leq y \leq 1$ and $0 \leq x \leq 1$. Mixed Mo/W catalysts, tungsten disulfide compositions and catalysts with improved surface areas can be used as part of the invention. The steps and embodiments described below with respect to $MoS_2$ and carbon-containing molybdenum disulfide ($MoS_{2-x}C_x$) catalysts can be used as steps and embodiments with respect to $Mo_{1-y}W_yS_{2-x}C_x$ with $0 \leq y \leq 1$ and $0 \leq x \leq 1$ compositions.

The process is suitable for implementation on a large scale such as in a batch reactor under high pressure (100–2000 $lb/in^2$) at 300 to 400° C.

When forming a promoted catalyst, the $A_xMoS_4$ precursor is decomposed in the presence of a Co, Ni, Ru, or Fe salt. This procedure increases the catalytic activity and stability of the resulting Co, Ni, Ru, or Fe promoted $MoS_2$ for the hydrotreating (e.g., HDS) reactions under typical conditions. The activated catalyst is then obtained by heating the promoted Co/$NiMoS_2$ in an environment with flowing $H_2S/H_2$ at a relatively high temperature. Thus, the improved $MoS_2$ catalytic materials are obtained by using appropriate precursors, activated under suitable conditions of temperature and pressure, as will be shown herein.

Methods of the invention include a process for forming a molybdenum disulfide catalyst having a surface area larger than 100 $m^2/g$. It is contemplated that the catalyst may have a surface area larger, smaller or at about 100, 110, 120, 130, 140, 150, 160, 170, 180, 190, 200, 210, 230, 240, 250, 260, 270, 280, 290, 300, 310, 320, 330, 340, 350, 360, 370, 380, 390, 400 or more $m^2/g$, or any range therein.

In some embodiments, this process involves adding a thiomolybdate salt precursor to a solution and decomposing the precursor under hydrothermal conditions to form a molybdenum disulfide catalyst. In some embodiments, the precursor is selected from the group consisting of ammonium, polyalkyl ammonium, polyalkyl, and diamine thiomolybdate. In order to facilitate the decomposition process, the solution may be agitated or stirred.

The process occurs under hydrothermal conditions in some embodiments. The term "hydrothermal conditions" refers generally to an environment containing water that is above its normal boiling point and under pressure. In still further embodiments, hydrothermal conditions comprise temperatures between about 250° C. and about 500° C. and pressures between about 100 and about 2000 psi. It is contemplated that the temperature may be about at least, at most, or at the following temperature: 200, 210, 230, 240, 250, 260, 270, 280, 290, 300, 310, 320, 330, 340, 350, 360, 370, 380, 390, 400, 410, 420, 430, 440, 450, 460, 470, 480, 490, 500 or more ° C., as well as ranges therein. For example, in some embodiments of the invention, the temperature is between about 300° C. and about 400° C.

It is contemplated that the pressure under which the process occurs is about at least, at most, or at the following pressure: 50, 60, 70, 80, 90, 100, 110, 120, 130, 140, 150, 160, 170, 180, 190, 200, 210, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1050, 1060, 1070, 1080, 1090, 1100, 1110, 1120, 1130, 1140, 1150, 1160, 1170, 1180, 1190, 1200, 1210, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990, 2000, 2010, 2020, 2030, 2040, 2050, 2060, 2070, 2080, 2090, 2100, 2110, 2120, 2130, 2140, 2150, 2160, 2170, 2180, 2190, 2200, or more psi, and ranges therein. For example, in some embodiments of the invention, the pressure is between about 100 psi and about 1500 psi.

In certain embodiments, the precursor is ammonium thiomolybdate. In others, it is a polyalkyl thiomolybdate, such as a tetraalkylthiomolybdate salt. In cases where the salt is a tetraalkylthiomolybdate, it may be a linear tetra-$C_1$ to $C_6$ alkyl or a branched tetra-$C_1$ to $C_6$ alkyl. In some cases, the tetraalklythiomolybdate is tetrabutyl-thiomolybdate or tetrahexyl-thiomolybdate.

In embodiments of the invention, the precursor is in or is part of a solution when it is subjected to the hydrothermal conditions of the process. In some embodiments, the solution is water or comprises water. In other embodiments, the solution comprises an organic solvent that has a boiling point of less than 200° C. under hydrothermal conditions. In some embodiments of the invention, the low boiling point organic solvent is selected from the group consisting of pentane, hexane, heptane, octane, nonane, and decane.

In addition to methods and processes for forming a molybdenum disulfide catalyst described above, the invention concerns generating promoted molybdenum disulfide catalysts by impregnating the molybdenum disulfide catalyst with a promoter salt. The term "impregnating" means to cause to be filled, imbued, mixed, furnished, or saturated. In some embodiments, the promoter salt is comprised of a metal, such as Co, Ni, Fe, or Ru. The promoted molybdenum disulfide catalyst is activated, in some embodiments, under flowing $H_2S/H_2$ and heat. In some embodiments, the activation occurs at a temperatures between about 250° C. and about 500° C. In other embodiments, the activation occurs at a temperatures between about 300° C. and about 400° C., or any temperature described above for hydrothermal conditions.

Thus, the invention covers a process for forming a molybdenum disulfide catalyst having a surface area larger than 100 $m^2/g$ by performing the following steps: (a) adding a thiomolybdate salt precursor to a solution; (b) decomposing the precursor under hydrothermal conditions to form a molybdenum disulfide catalyst. The process may further include: (c) impregnating the molybdenum disulfide catalyst with a promoter salt to produce a promoted molybdenum disulfide catalyst. The process may further include: (d) activating the impregnated molybdenum disulfide catalyst under flowing $H_2S/H_2$ and heat to produce an activated, promoted molybdenum disulfide catalyst.

The invention also concerns compositions of matter that include a molybdenum disulfide catalyst having a surface area larger than about 100 m²/g. In some cases, the catalyst further comprises an inorganic binder selected from the group consisting of $Al_2O_3$, $TiO_2$, $SiO_2$, and $MgO$. In some cases, the catalyst has the formula $MoS_{2-x}C_x$ where $0 \leq x \leq 1$. In some embodiments, the catalyst has the formula $MoS_2$. In other embodiments, the catalyst has the formula $Mo_{1-y}W_y S_{2-x}C_x$ with $0 \leq y \leq 1$ and $0 \leq x \leq 1$. The invention also concerns compositions of matter that include a promoted molybdenum disulfide catalyst having a surface area larger than about 100 m²/g. In some cases, the promoted catalyst further comprises an inorganic binder selected from the group consisting of $Al_2O_3$, $TiO_2$, $SiO_2$, and $MgO$. In some cases, the promoted catalyst has the formula $M/MoS_{2-x}C_x$, where $0 \leq x \leq 1$ and M is Co, Ni, Fe, or Ru. In some embodiments, the promoted catalyst has the formula $M/MoS_2$, where M is a promoter metal. In specific embodiments, the promoter metal is Co, Ni, Fe, or Ru. In other embodiments, the catalyst has the formula $M/Mo_{1-y}W_y S_{2-x}C_x$ with $0 \leq y \leq 1$ and $0 \leq x \leq 1$ and M is Co, Ni, Fe, or Ru.

It is contemplated that any aspect of the invention discussed in the context of one embodiment of the invention may be implemented or applied with respect to any other embodiment of the invention. Likewise, any composition of the invention may be the result or may be used in any method or process of the invention.

The use of the term "or" in the claims is used to mean "and/or" unless explicitly indicated to refer to alternatives only or the alternative are mutually exclusive, although the disclosure supports a definition that refers to only alternatives and "and/or."

Throughout this application, the term "about" is used to indicate that a value includes the standard deviation of error for the device or method being employed to determine the value.

The use of the word "a" or "an" when used in conjunction with the term "comprising" in the claims and/or the specification may mean "one," but it is also consistent with the meaning of "one or more," "at least one," and "one or more than one."

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
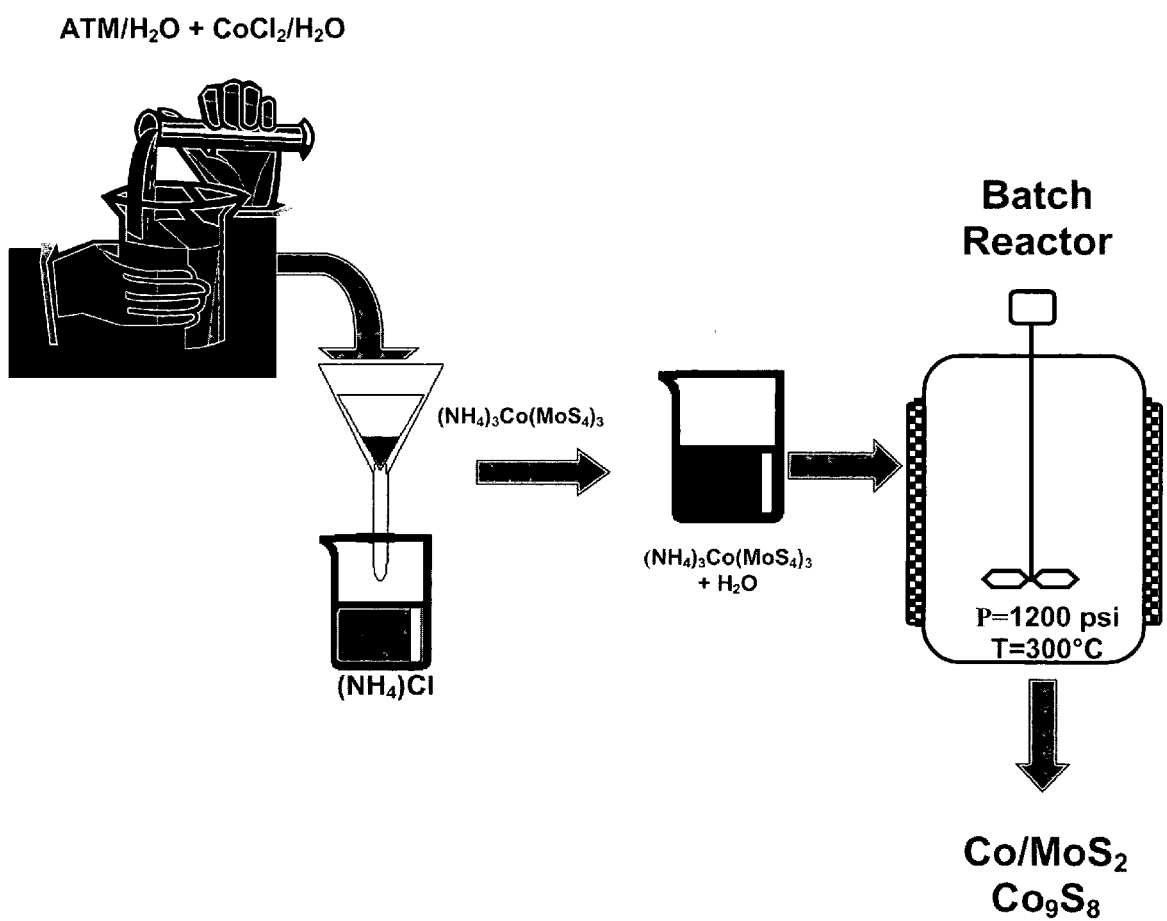
FIG. 1. The promoter containing catalyst precursor is prepared in the first step, followed by catalyst synthesis in the second step. This entire two-step process is schematically shown is FIG. 1. Catalysts prepared in Method B are tested for catalytic activity directly without a need for a sulfidation step.

The present invention provides a method for making molybdenum disulfide ($MoS_2$) and carbon-containing molybdenum disulfide ($MoS_{2-x}C_x$) catalysts showing improved surface area for hydrotreating processes. The catalysts are formed from precursor salts generally having the formula, $A_xMoS_4$, where A is an ammonium or tetraalkyl ammonium ion (x is 2 for such cases) or a diamine ion (x is 1 in this case). The resulting molybdenum disulfide can be used alone or as a support for a promoter such as cobalt, ruthenium, iron, or nickel. The $MoS_2$ materials are formed in solutions that can be aqueous or a mixture of aqueous and organic components under hydrothermal conditions. The process is suitable for implementation on a large scale such as in a batch reactor under high pressure (100–2000 lb/in²) at 300 to 400° C.

When forming a promoted catalyst, the $A_xMoS_4$ precursor is decomposed in the presence of a Co, Ni, Ru, or Fe salt. This procedure increases the catalytic activity and stability of the resulting Co, Ni, Ru, or Fe promoted $MoS_2$ for the hydrotreating (e.g., HDS) reactions under typical conditions. The activated catalyst is then obtained by heating the promoted Co/Ni$MoS_2$ in an environment with flowing $H_2S/H_2$ at a relatively high temperature. Thus, the improved $MoS_2$ catalytic materials are obtained by using appropriate precursors, activated under suitable conditions of temperature and pressure, as will be shown herein.

I. Related Patents

The following patents, though describing conventional catalysts, may be used in conjunction with the present invention. Thus, their content is incorporated by reference. U.S. Pat. No. 4,243,554 to Naumann et al. ("Naumann") teaches cobalt and nickel promoted molybdenum disulfide catalysts with relatively high surface areas. U.S. Pat. No. 4,508,847 to Chianelli et al. discloses a carbon-containing $MoS_2$ catalyst. U.S. Pat. No. 4,431,747 to Seiver et al. teaches a similar $MoS_2$ catalyst. U.S. Pat. Nos. 4,528,089 and 4,650,563 also disclose carbon-containing molybdenum sulfide catalysts. U.S. Pat. Nos. 4,581,125 and 4,514,517 disclose molybdenum disulfide catalysts. U.S. Pat. No. 4,839,326 discloses a catalyst formed by treating molybdenum sulfide- or tungsten sulfide-containing materials supported with an organometallic complex containing a transition metal promoter such as Co, Fe, and Ni. Similarly, U.S. Pat. No. 4,820,677 teaches a catalyst formed from an amorphous sulfide of iron and a metal selected from Mo, W, and mixtures thereof, along with a metal sulfide of at least one metal that has Co, Ni, Mn, Zn, Cu or a mixture thereof. U.S. Pat. No. 4,279,737 discloses chalcogenides that are superior catalysts for the treatment of hydrocarbons. Finally, Song et al. (U.S. Pat. No. 6,156,693) teaches a method for preparing $MoS_2$ catalysts, including use of aqueous solvents. However, this patent teaches only the use of tridecane solvent, an expensive viscous solvent that has a high boiling point.

II. Preparation Process

The present invention generally covers two different methods (A and B).

Method A: Three-Step Process

The inactive $MoS_2$ catalysts are generally prepared in two steps, followed by activation as the third step. In the first step, a $MoS_2$ material (substrate formation step) with relatively high surface area (e.g., greater than 70 m²/g or more particularly greater than 80 m²/g, 90 m²/g, 100 m²/g, 125 m²/g, 150 m²/g or 200 m²/g) is obtained by decomposing an $A_xMoS_4$ precursor salt (e.g., ammonium, amine or tetraalkylammonium thiosalt) under hydrothermal conditions. The hydrothermal pressure RANGES from 100 to 2000 psi. A recommended hydrothermal pressure range is 100 to 1500 psi. In the second step, the $MoS_2$-based material is impregnated (impregnation step) with a salt of cobalt or nickel. In the third step, this inactive promoted Co/NiMoS$_2$ catalyst is then activated (sulfidation step) by subjecting it to $H_2/H_2S$ flow at a high temperature. The temperature range is from 250 to 500° C.

Method B: Two-Step Process

The promoter containing catalyst precursor is prepared in the first step (room temperature chemistry step), followed by catalyst synthesis in the second step under hydrothermal conditions, as discussed above with respect to Method A. This entire two-step process is schematically shown is FIG. 1. Catalysts prepared in Method B are tested for catalytic activity directly without a need for a sulfidation step.

A. Decomposition of $A_xMoS_4$ Precursor

Precursor salts useful in forming the catalysts of the present invention will be referred to as $A_x$-thiomolybdate salts and will have the general formula, $A_xMoS_4$, where A is an ammonium or tetraalkyl ammonium ion, a tetralalkyl ion (x would be 2 for such cases) or a diamine ion (x would be 1 in this case). The tetraalkyl is preferably a saturated linear $C_1$ to $C_6$ alkyl, a saturated branched tetra-$C_1$ to $C_6$ alkyl or a tetra-cyclic $C_4$ to $C_6$ alkyl. The tetraalkyl may be halogenated (e.g., substituted with Br or Cl). The four alkyl groups making up the tetraalkyl may all be indentical substituent (e.g., $4R_1$) or they may comprise two to four different alkyls ($3R_1$—$R_2$, $2R_1$-$2R_2$ or $R_1$—$R_2$—$R_3$—$R_4$). Exemplary alkyls include methyl, ethyl, n-propyl, n-butyl, n-pentyl, n-hexyl, isopropyl, isobutyl, isopentyl, isohexyl, tertbutyl, cyclopentyl, cyclohexyl, perfluoro methyl, perfloro ethyl, etc. Illustrative but non-limiting examples of suitable $A_x$-thiomolybdate salts useful in producing the catalysts of this invention include ammonium thiomolybdate (ATM), tetrabutyl ammonium thiomolybdate (TBATM) and tetrahexylammonium thiomolybdate (THATM).

The larger alkyls used in a tetraalkyl ammonium ion will sterically hinder the atoms as they form the thiomolybdate crystal lattice. This will probably affect the catalyst product. Larger alkyl groups are more likely to leave residual carbon in the product, making the process less clean. The size and steric bulk of the alkyl group will affect the stability of the alkyl ammonium and therefore will affect the rate of decomposition. More stable tetrasubstituted alkyls will require higher temperatures for decomposition.

Decomposition of the precursor salt occurs in an aqueous environment or a combination of aqueous and organic solvent. The solvent used for this decomposition step (i.e., synthesis of the $MoS_2$ support) is water. Nevertheless, any suitable low boiling point (LBP) hydrocarbon (i.e., a hydrocarbon solvent with a boiling point lower than 200° C.), or a mixture of water and LBP hydrocarbon may be used. Suitable LBP organic solvents include but are not limited to pentane, hexane, heptane, octane, nonane and decane.

The hydrothermal conditions described herein include conditions in which heated water is included during the decomposition process. The solution may be heated or hot water or steam may be added. The temperature is between 250 and 500° C. or more preferably between 300 and 400° C. The decomposition may occur with additional agitation or stirring to facilitate the decomposition. This may be important in that the reaction contains components in different phases, and agitation will allow for the reaction to go to completion. The solution may be heated to a temperature above the critical point of water (374.1° C.). Since fluid properties of water and of a solution containing water change rapidly with both temperature and pressure when near the critical point, it is important to control the temperature and pressure in that they will both affect the product $MoS_2$.

The process also occurs under high pressure. This pressure is between 100 and 2000 psi or more preferably between 100 and 1500 psi. The pressure may be obtained by increasing the partial pressure of $H_2$ in the reaction vessel.

In one embodiment, the $A_x$-thiomolybdate salt solution is subjected to heating at between 300–500° C. in a pressurized (100–1500 psi) hydrogen environment. For mass catalyst production, such decomposition can be performed in a conventional batch reactor.

The decomposition of ATM to $MoS_2$ occurs in the following manner:

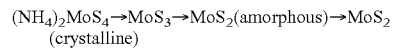
$(NH_4)_2MoS_4 \rightarrow MoS_3 \rightarrow MoS_2(\text{amorphous}) \rightarrow MoS_2$
(crystalline)

As can be seen, the decomposition process occurs in three basic stages. Initially, ammonium disulfide is eliminated resulting in molybdenum trisulfide. Next, sulfur is lost through a reaction with the $H_2$ in the environment, which results in amorphous molybdenum disulfide. Thus, it can be seen that the sulfur required during the formation of the $MoS_2$ is provided by the precursor. Finally, under the temperature and pressure of the reaction, the amorphous $MoS_2$ aggregates and becomes ordered into high surface area crystalline form.

B. Promotion

Once formed, the $MoS_2$ can serve as a support for a suitable promoter metal such as Co, Ni, Ru, or Fe. One or more of these promoters can be impregnated into the $MoS_2$. Impregnation of the promoter occurs by adding metallic salt, a metallic oxide, or a metal sulfide solution ($MCl_{2-3}$, $M(NO_3)_{2-3}$, MSx, $M(CO)_x$ where M=Ni, Co, Ru, or Fe) to the poorly crystalline $MoS_2$. The molar ratio (M/Mo) is varied from 0.2 to 0.5 (M=Co, Ni, Ru or Fe).

C. Activation

The promoted but inactive $MoS_2$ catalyst is finally treated under flowing $H_2/H_2S$ at a temperature that is in a range of 350 to 450° C., but preferably at 400° C. for a suitable duration such as two hours. The partial pressure of the $H_2/H_2S$ is preferably 2–2000 psi or more preferably 5 to 30 psi. The catalyst may be stirred or otherwise agitated during exposure to the $H_2/H_2S$ to increase activation. The sulfur required for the activation of the final catalyst is provided by gaseous $H_2S$, and the required hydrogen is derived from the flowing, gaseous hydrogen. The resulting activated catalyst has greater activity than conventional catalysts such as cobalt molybdate on alumina.

D. Catalytic Activity (HDS of DBT) Determination

The hydrodesulfurization (HDS) of Dibenzo Thiophene (DBT) can be carried out according to a number of ways well known to those of skill in the art. The main reaction products from the HDS of DBT are biphenyl (BIP) and phenylcyclohexane (PCH). Selectivity for the main reaction products (BIP, PCH) can be determined for $MoS_2$ and promoted $MoS_2$ catalysts prepared for each precursor. Selectivity can be calculated for a given product as the weight percentage of the product in the product mixture.

E. Precursor Preparation

The preparation of tetraalkylammonim precursors catalysts $(R_4N)_2MoS_4$ can be done according to the methodology previously reported by Alonso et al. 2001a, Alonso et al., 2001b, and Alonso et al. 1998c, which are specifically incorporated by reference.

Precursor preparation can also be done according to the following two methods. These methods are collectively and informally referred to as the "BRENDA" method of precursor preparation. In the first method, depicted generally in FIG. 1, begin by weighing 1 g of ammonium thiomolybdate (ATM). Next, weigh 0.4452 g of $CoCl_2$ hex hydrated. Next, at room temperature, dissolve 1 g of ATM in 20 ml of distilled water. Then, dissolve 0.4452 g of $CoCl_2$ hex hydrated in 10 ml of distilled water. Finally, mix both solutions by stirring. A black precipitate will be obtained. Filter this precipitate in a vacuum. The filtered precipitate can then be placed inside a batch reactor to synthesize the catalyst.

In the second method, begin by weighing 1 g of ammonium tiomolybdate (ATM). Next, weigh 2.91 g of pentyl ammonium bromide. Next, dissolve 1 g of ATM in 20 ml of distilled water. Then, dissolve 2.91 g of pentyl ammonium bromide in 50 ml of a mix 5:1 of isopropanol/distillated water. Stir the mixture with a magnetic stirrer for 15 minutes. Then, add the ATM solution to pentyl ammonium bromide solution while agitation continues, and let it stir for 15 more minutes. Next, filter the solution in a vacuum. An orange precipitate will be obtained. Extend the precipitate in a dish to let it dry at room temperature. The precipitate is air sensitive, and therefore limited exposure is recommended. Once the precipitate is dried, weight it (X g) and dissolved it in 50 ml of a solution 1:1 ethanol/water with agitation. Then, dissolve Y g of $COCl_2$ hex hydrated in 10 ml of distilled water. Use 0.1415 g (Y) of $CoCl_2$ hex hydrated for every 1 g (X) of precipitate obtained. Next, mix both solutions, and a black sticky precipitate will be obtained. Filter the precipitate. The filtered precipitate can then be placed inside a batch reactor to synthesize the catalyst.

F. Use of Catalysts

The resulting catalysts may be used in a variety of reactions or may be further processed. The catalyst may be heated under hot isostatic pressure to create an improved catalyst/amorphous sulfide sieves that can be used in a wide variety of applications such as hydrotreating processes, including those used in the petrochemical field. The provisional application with U.S. Ser. No. 60/460,951 entitled "Preparation of Amorphous Sulfide Sieves," filed in the names of Mohammad H. Siadati, Gabriel Alonso, Moh'd Refaei, and Russell R. Chianelli on Apr. 7, 2003, discusses such additional uses for catalysts of the invention. This application is specifically incorporated by reference. The nonprovisional application claiming priority to U.S. Ser. No. 60/460,951, entitled "Preparation of Amorphous Sulfide Sieves" and filed in the names of Mohammad H. Siadati, Gabriel Alonso, and Russell R. Chianelli on Apr. 7, 2004, is also specifically incorporated by reference.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Catalytic Activity Determination

The HDS of DBT was carried out in a Parr model 4522 high-pressure batch reactor. One gram of catalyst was placed in the reactor with the reagents (5% vol of DBT in decaline). The reactor was then pressurized to 3.1 MPa with hydrogen and heated to 623K at a rate of 10 K/min. After the working temperature was reached, sampling for chromatographic analysis was performed during the course of each run to determine conversion versus time dependence. Reaction runs averaged about 5 h. The reaction products were analyzed using a Perkin Elmer™ Auto-system gas chromatograph with a 6 ft long, 1/8 inch packed column containing OV-3 (phenyl methyl dimethyl silicone, 10% phenyl) as a separating phase.

The main reaction products from the HDS of DBT are biphenyl (BIP) and phenylcyclohexane (PCH). Selectivity for the main reaction products (BIP, PCH) was determined for $MoS_2$ and promoted $MoS_2$ catalysts prepared for each precursor. Selectivity was calculated for a given product as the weight percentage of the product in the product mixture.

Precursor Preparation

Twelve grams of ammonium heptamolybdate $(NH_4)_6[Mo_7O_{24}].4H_2O$ were dissolved in 60 mL of water. Then an excess of high concentrated ammonium sulfide aqueous solution ($(NH_4)_2S$, 100 g, 42.5%) was added at room temperature to the ammonium heptamolybdate solution. The solution became immediately red-orange and was heated moderately at 55° C. After 30 min the solution was cooled down in ice bath without stirring and was kept at this temperature for 3 hours. Precipitated red crystals of ammonium thiomolybdate $(NH_4)_2MoS_4$ (ATM) were filtered and washed several times with isopropanol.

The preparation of tetraalkylammonim precursors catalysts $(R_4N)_2MoS_4$ was done according with the methodology previously reported in Alonso et al., 2001a, Alonso et al., 2001b, and Alonso et al., 1998c.

Example 2

This example shows the first step—the substrate formation step—of Method A in which an $MoS_2$ substrate is formed from ammonium thiomolybdate (ATM) under hydrothermal conditions.

Ten grams of ATM were added to 75 mL of water, the solution was placed inside a high-pressure reactor at room temperature, the reactor was purged two times with flowing hydrogen and then pressurized to 20 psi with the same hydrogen gas. The temperature was raised to 300 C and the pressure was increased to 1300 psi. These conditions were maintained for two hours. The reactor was depressurized and the $MoS_2$ material was recovered from the reactor and washed with isopropanol. The $MoS_2$ unpromoted catalyst was characterized using techniques XRD, EDS, SEM and BET.

The XRD pattern showed poorly crystalline structure. The SEM micrographs showed fine and uniform powder particles. The BET results indicated 169 $m^2/g$ of surface area before the HDS of DBT reaction.

After the catalytic activity reaction, the surface area was 46 $m^2/g$. The zero order rate constant, k, was $7 \times 10^{-7}$ mol/g.s.

Examples 3–6

Examples 3–6 demonstrate the effect of various promoters impregnated by applying the second step of Method A on the final properties (after applying the third step of Method A, i.e., the sulfidation step) of the $MoS_2$ catalysts derived from ATM.

The preparation of $MoS_2$ support was identical to that of Example 2 (first step of Method A). In the second step, the $MoS_2$ support was impregnated with a solution water of $MCl_2$ or $M(NO_3)_2$ salts at 20 wt % of M as promoter, where M=Co, Ni, Ru and Fe. The material was dried at 120° C. in an oven for 1 hour. After drying, it was placed in a tube furnace and heated at 400° C. for two hours in $H_2S/H_2$ (50%/50%) flow (third step). The $M/MoS_2$ catalyst was characterized by several techniques XRD, EDS, SEM and BET.

The XRD pattern showed the characteristic poorly crystalline structure. The SEM micrographs showed fine and uniform particles. The BET results for the $Co/MoS_2$ catalyst indicated 29 $m^2/g$ of surface area before the reaction and 15 $m^2/g$ after the HDS reaction. The reaction rate for the HDS of DBT was $26\times10^{-7}$ mol/g.s, around 4 times greater than $MoS_2$ without any promoter, and little over 2 times the industrial one indicated in Example 7.

Results obtained with $MoS_2$ catalysts promoted with Co, Ni, Ru and Fe are reported in Table A. Results from Example 7 (below) are also included in Table A.

Example 7

In this example an industrial $Co$—$Mo/Al_2O_3$ catalyst was evaluated in the reaction of HDS of DBT, using the same conditions as in Examples 2 through 6. The rate constant for the industrial cobalt molybdate on alumina catalyst, activated under $H_2S/H_2$ during two hours at 400° C. was $12\times10^{-7}$ mol/g.s.

from the tetraalkyl precursor contain both carbon and sulfur and therefore it will be referred as a molybdenum carbosulfide phase i.e., $MoS_2$—C. The $MoS_2$—C catalyst was characterized using XRD, EDS, SEM and BET.

The XRD pattern showed poorly crystalline structure. The SEM micrographs showed very porous structure with cavities resulting from elimination of the organic part at these conditions of temperature and pressure. The BET results indicated 193 $m^2/g$ of surface area before the HDS of DBT reaction. After the catalytic activity reaction, the surface area was 71 $m^2/g$. The zero order rate constant, k, was $8\times10^{-7}$ mol/g.s.

Examples 9–12

Examples 9–12 demonstrate the effect of various promoters impregnated by applying the second step of Method A on the final properties (after applying the third step of Method A, i.e., the sulfidation step) of the $MoS_2$—C catalysts derived from TBATM.

The preparation of $MoS_2$—C support was identical to that of Example 8 (first step of Method A). In the second step, the $MoS_2$—C support was impregnated with a solution water of $MCl_2$ or $M(NO_3)_2$ salts at 20 wt% or 30% mol of M as promoter, where M=Co, Ni, Ru and Fe. The material was

TABLE A

The zero order rate constant, surface area and selectivity

| Example | Catalyst | % BP | % CHB | HYD/HDS | k × $10^{-7}$ (mol/g · s) | S.A. ($m^2$/g) before | S.A. ($m^2$/g) after |
|---|---|---|---|---|---|---|---|
| 2 | $MoS_2$ | 43.8 | 56.2 | 1.28 | 7 | 169 | 46 |
| 3 | $Co/MoS_2$ | 70.2 | 24.8 | 0.43 | 26 | 29 | 15 |
| 4 | $Ni/MoS_2$ | 50.3 | 49.7 | 0.99 | 13 | 66 | 13 |
| 5 | $Ru/MoS_2$ | 55.4 | 44.6 | 0.81 | 15 | 83 | 14 |
| 6 | $Fe/MoS_2$ | 45.2 | 54.8 | 1.21 | 3.6 | 96 | 23 |
| 7 | Induatrial | | | | 12 | | |

Example 8

This example shows the first step of Method A, describing the $MoS_2$—C substrate formation step from tetrabutylammonium thiomolybdate (TBATM) under hydrothermal conditions.

20 grams of tetrabutylammonium thiomolybdate (TBATM) $[(But)_4N]_2MoS_4$ were added to 80 mL of water, the solution was placed inside a high-pressure reactor at room temperature, the reactor was purged then pressurized to 20 psi with hydrogen gas. The temperature was raised to 300° C. and the pressure was increased to 1300 psi. These conditions were maintained for two hours. The reactor was depressurized and the $MoS_2$ material was recovered from the reactor and washed with isopropanol. The $MoS_2$ derived dried at 120° C. in an oven for 1 hour. After drying, it was placed in a tube furnace and heated at 400° C. for two hours in $H_2S/H_2$ (50%/50%) flow (third step).

The $M/MoS_2$—C catalyst was characterized by several techniques XRD, EDS, SEM and BET. The XRD pattern showed the characteristic poorly crystalline structure of $MoS_2$. The SEM micrographs showed uniform particles. The characterization results for $M/MoS_2$—C catalyst and zero order rate constant, k, value are presented in Table B.

TABLE B

| Example | CATALYST | % BP | % CHB | HYD/HDS | k × $10^{-7}$ (mol/g · s) | S.A. ($m^2$/g) before | S.A. ($m^2$/g) after |
|---|---|---|---|---|---|---|---|
| 8 | $MoS_2$—C | 40.6 | 59.4 | 1.46 | 8 | 193 | 71 |
| 9 | $Co/MoS_2$—C | 66.7 | 33.3 | 0.50 | 26 | 113 | 111 |
| 10 | $Ni/MoS_2$—C | 46.2 | 53.8 | 1.16 | 16 | 110 | 108 |
| 11 | $Ru/MoS_2$—C | 78.4 | 21.5 | 0.27 | 18 | 66 | 101 |
| 12 | $Fe/MoS_2$—C | 56.2 | 43.8 | 0.77 | 6 | 98 | 96 |

Example 13

This example shows the first step of Method A, describing the $MoS_2$—C substrate formation step from tetrahexylammonium thiomolybdate (THexATM) [(Hex)$_4$N]$_2$MoS$_4$ under hydrothermal conditions.

Fifty grams of tetrahexylammonium thiomolybdate (THexATM) [(Hex)$_4$N]$_2$MoS$_4$ were added to 80 mL of water, the solution was placed inside a high-pressure reactor at room temperature, the reactor was purged then pressurized to 20 psi with hydrogen gas. The temperature was raised to 300° C. and the pressure was increased to 1350 psi. These conditions were maintained for two hours. The reactor was depressurized and the MoS$_2$—C material was recovered from the reactor and washed with isopropanol. The MoS$_2$—C catalyst was characterized using XRD, EDS, SEM and BET.

The XRD pattern showed poorly crystalline structure. The SEM micrographs showed very porous structure with cavities resulting from elimination of the organic part in these conditions of temperature and pressure. The BET results indicated 238 m$^2$/g of surface area before the HDS of DBT reaction. After the catalytic activity reaction, the surface area was 210 m$^2$/g. The zero order rate constant, k, was 7×10$^{-7}$ mol/g.s.

Examples 14–17

Examples 14–17 demonstrate the effect of various promoters impregnated by applying the second step of Method A on the final properties (after applying the third step of Method A, i.e., the sulfidation step) of the MoS$_2$—C catalysts derived from THATM.

The preparation of MoS$_2$—C support was identical to that of Example 13 (first step of Method A). In the second step, the MoS$_2$—C support was impregnated with a solution water of MCl$_2$ or M(NO$_3$)$_2$ salts at 20 wt % or 30 % mol of M as promoter, where M=Co, Ni, Ru and Fe. The material was dried at 120° C. in an oven for 1 hour. After drying, it was placed in a tube furnace and heated at 400° C. for two hours in H$_2$S/H$_2$ (50%/50%) flow (third step).

The M/MoS$_2$—C catalysts were characterized by several techniques XRD, EDS, SEM and BET. The XRD patterns showed the characteristic poorly crystalline structure of MoS$_2$. The SEM micrographs showed uniform particles. The characterization results for M/MoS$_2$—C catalysts and zero order rate constant, k, value are presented in Table C.

TABLE C

| Example | Catalyst | % BP | % CHB | HYD/HDS | k × 10$^{-7}$ (mol/g · s) | S.A. (m$^2$/g) before | S.A. (m$^2$/g) after |
| --- | --- | --- | --- | --- | --- | --- | --- |
| 13 | MoS$_2$—C | 52.1 | 47.9 | 0.9 | 7 | 238 | 210 |
| 14 | Co/MoS$_2$—C | 67.6 | 32.4 | 0.48 | 25 | 170 | 160 |
| 15 | Ni/MoS$_2$—C | 43.7 | 56.3 | 1.3 | 21 | 175 | 111 |
| 16 | Ru/MoS$_2$—C | 50.1 | 50.0 | 1.0 | 24 | 134 | 86 |
| 17 | Fe/MoS$_2$—C | 42.5 | 57.5 | 1.3 | 7 | 91 | 96 |

Example 18–24

Figure 2:
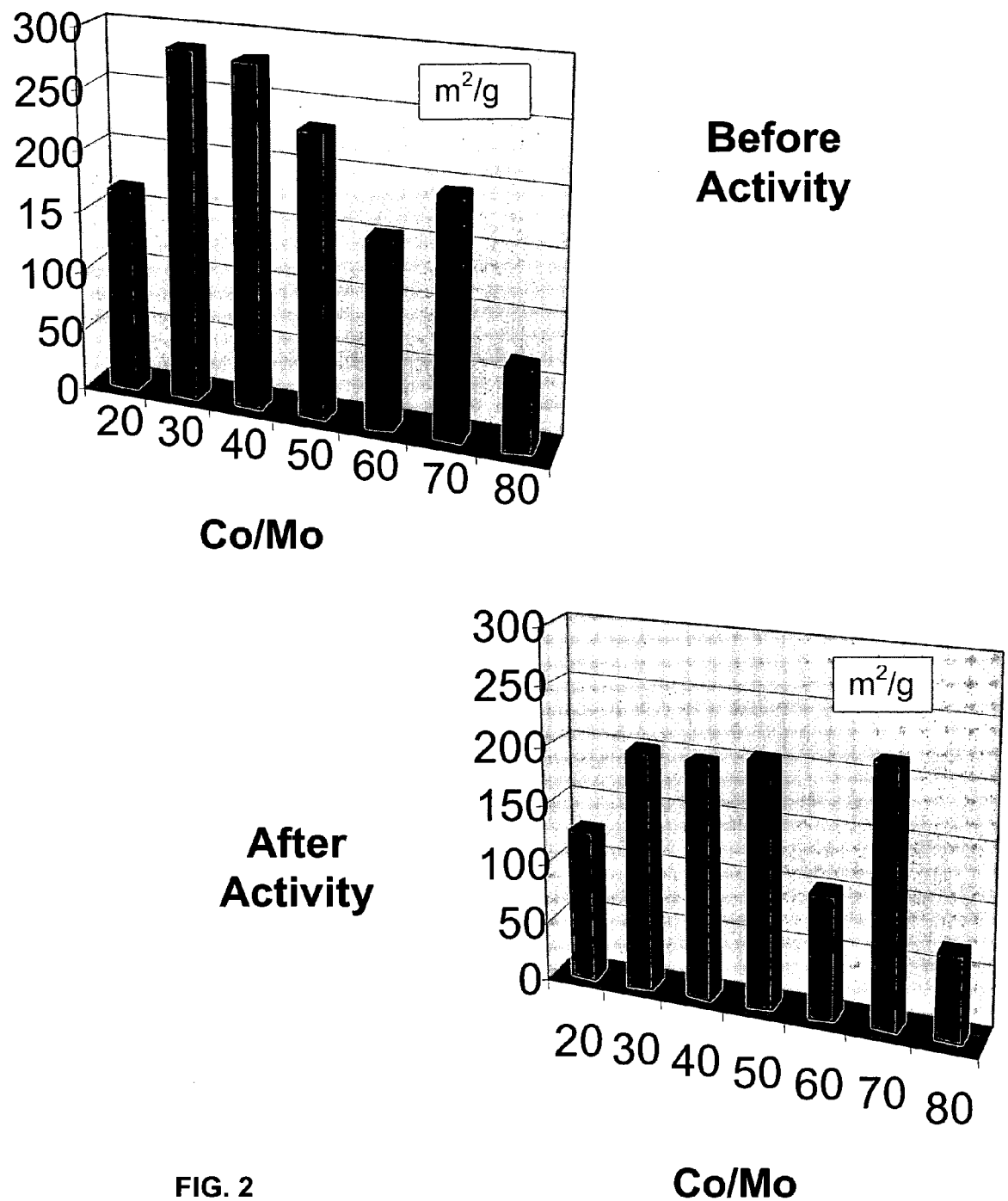
FIG. 2. Various ratios of Co to Mo were used in the precursor making step. This figure shows the surface areas of catalysts before and after activity tests.
Figure 3:
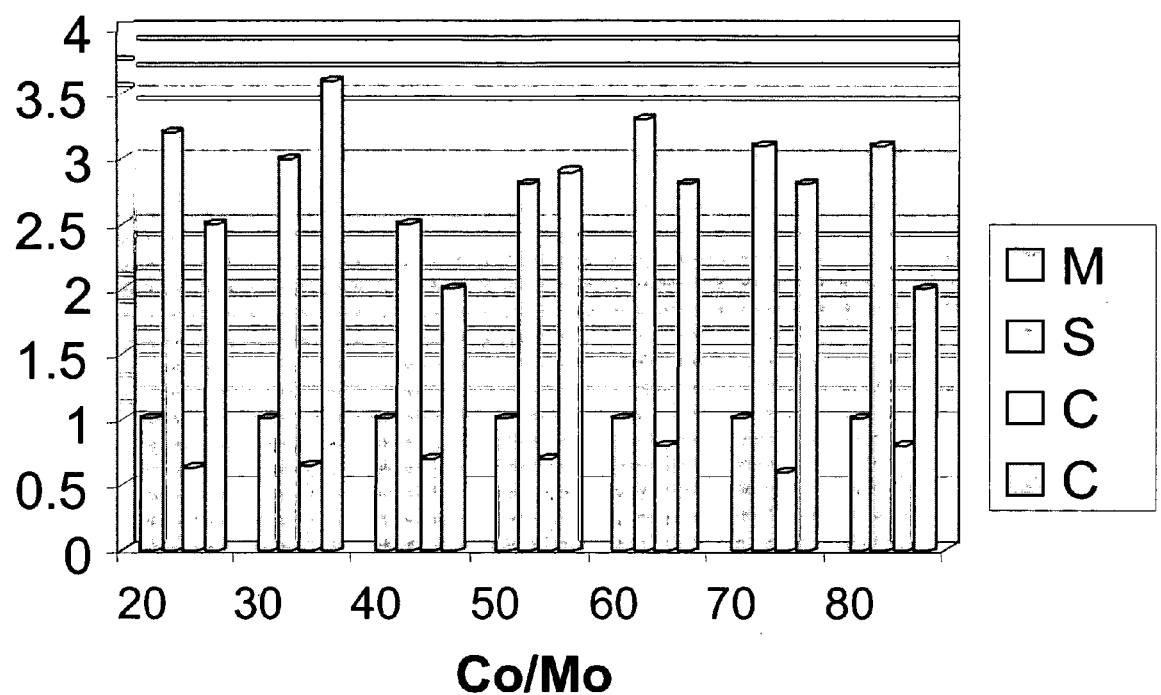
FIG. 3. This figure shows the relative amounts of each component in the final catalysts.
Figure 4:
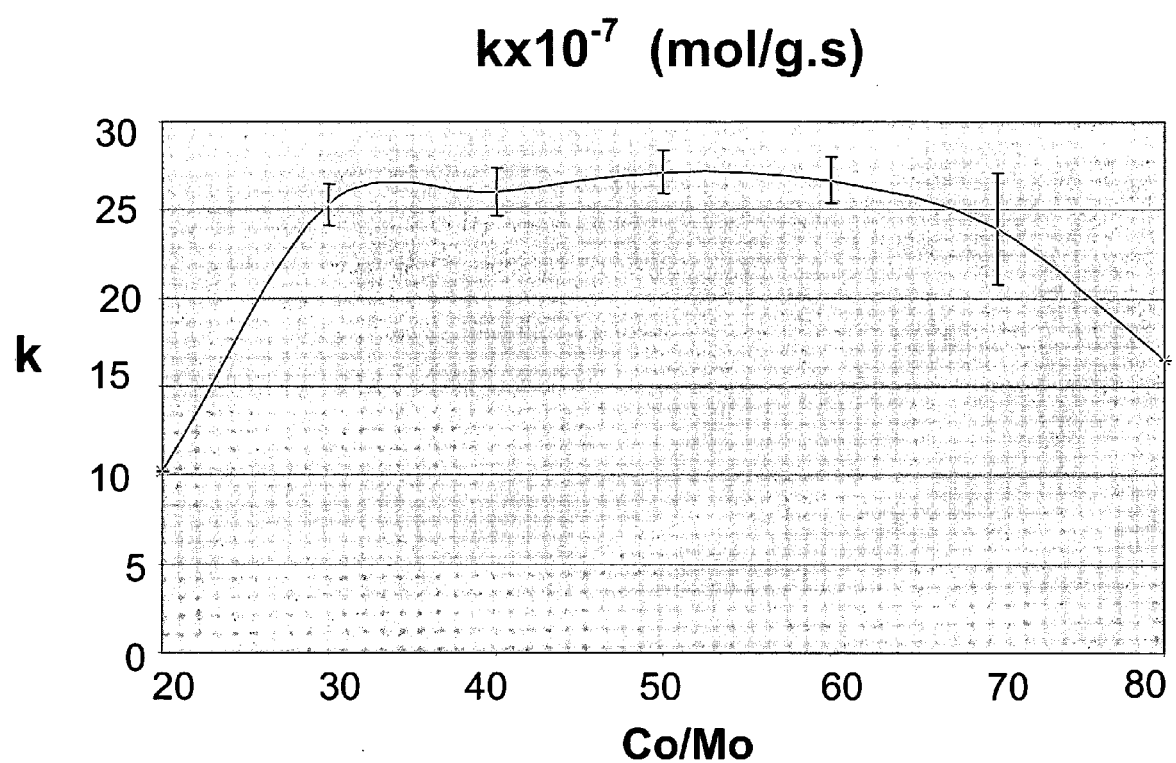
FIG. 4. This figure shows the k values for all runs.

Employing Method B, seven various ratios of Co to Mo were used in the precursor making step. FIG. 2 shows the surface areas of all seven catalysts before and after activity tests. FIG. 3 shows the relative amounts of each component in the final catalysts. FIG. 4 shows the k values for all seven runs and indicates that the best k value of 27 is from a Co to Mo ratio of 50. For comparison purposes, this sample is shown in Table D as Example 18.

Comparison of Results

Results of the best catalysts made from different runs as compared with the industrial catalyst.

TABLE D

| Example | Catalyst | k × 10$^{-7}$ (mol/g · s) | S.A. (m$^2$/g) before | S.A. (m$^2$/g) after |
| --- | --- | --- | --- | --- |
| 7 | Industrial | 12 | | |
| 3 | Co/MoS$_2$ | 26 | 29 | 15 |
| 9 | Co/MoS$_2$—C | 26 | 113 | 111 |
| 14 | Co/MoS$_2$—C | 25 | 170 | 160 |
| 18 | Co/MoS$_2$—C | 27 | 220 | 200 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents that are chemically related may be substituted for the agents described herein while the same or similar results would be achieved. All such similar substitutes and modifications apparent to those skilled in the art are deemed to be within the spirit, scope and concept of the invention as defined by the appended claims.

V. References

The following references are specifically incorporated herein by reference.

U.S. Pat. No. 4,243,554
U.S. Pat. No. 4,431,747
U.S. Pat. No. 4,508,847
U.S. Pat. No. 4,514,517
U.S. Pat. No. 4,528,089
U.S. Pat. No. 4,581,125
U.S. Pat. No. 4,650,563
U.S. Pat. No. 4,820,677
U.S. Pat. No. 4,880,761
U.S. Pat. No. 4,839,326
U.S. Pat. No. 5,057,296
U.S. Pat. No. 5,102,643
U.S. Pat. No. 5,565,142
U.S. Pat. No. 6,156,693
U.S. Pat. No. 6,299,760
U.S. Pat. No. 687,842
Canadian Patent No. 680,160
Alonso et al., 17th North American Catalysis Society Meeting, Ontario, Canada, Jun. 3–8, 2001.

Alonso et al., *Catalysis Letters* 52:55, 1998a.
Alonso et al., *Catalysis Today* 43:117, 1998b.
Alonso et al., *Inorg. Chim. Acta* 274:108, 1998c.
Alonso et al., *Inorg. Chim. Acta* 316:105, 2001a.
Alonso et al., *Inorg. Chim. Acta* 325:193, 2001b.
Atkinson et al., *Metallurgical and Materials Transactions A* 31A:2981, 2000.
Beck et al., *J. Am. Chem. Soc.* 114:10834, 1992.
Brito et al., *Thermochimica Acta* 256:325, 1995.
Brownlee, Statistical Theory and Methodology in Science and Engineering, 2nd Edition, Wiley, N.Y., p. 590, 1965.
Chianelli et al., *Catalysis Today* 53:357, 1999.
Chianelli et al., *Inorg. Chem* 17:2758, 1978.
Chianelli, *International Reviews in Physical Chemistry* 2:127, 1982.
Corleis, *Ann Chem.* 232:244, 1886.
Cramer et al., *J. Am. Chem. Soc.* 100:339, 1978a.
Cramer et al., *J. Am. Chem. Soc.* 100:3814, 1978b.
EPA Regulatory Announcement EPA420-F-00-057, December 2000.
*Federal Register* 65:6701, 2000.
Frommell et al., in: Proc. 12$^{th}$ North American Meeting of Catalytic Soc., Lexington, Ky., PD-38, 1991.
Frye et al., *Chem. Eng. Prog.* 63:66, 1967.
Fuentes et al., *J. Catal.* 113:535, 1988.
Girgis et al., *Ind. Eng. Chem. Res.* 30:2021, 1991.
Houalla et al., *J. Catal.* 61:523, 1980.
Inamura et al., *J. Catal.* 147:515, 1994.
Iwata et al., *Cat. Today* 45:353, 1998.
Jiang et al., *Chem.* 8:721, 1998.
Kistler, *Nature* 127:741, 1931.
Kresge et al., *Nature* 359:710, 1992.
Kruss, *Ann. Chem.* 225:1, 1884.
Land et al., *J. Non-Cryst. Solids* 283:11, 2001.
Leist et al., *Chem.* 8:241, 1998.
Liang et al., *J. Non-crystalline Solids* 79:251, 1986.
Ma et al., Microporous and Mesoporous Materials, 37:243–252, 2000.
McDonald et al., *Inorg. Chem. Acta* 72:205, 1983.
Müller (Ed.), "Transition Metal Chemistry-Current Problems of general, Biological and catalytical relevances", Verlag Chemie, Weinheim, 1981; A. Müller and W. E. Newton (Ed.), "Nitrogen Fixation: Chemical, Biochemical, Genetics Interfaces", Plenum Press, New York, 1982.
Muller, *Coord. Chem.* 432:127, 1977.
Pan et al., *Inorg. Chem.* 22:672, 1983.
Prasad et al., *J. Inorg. Nucl. Chem.* 35:1895, 1973.
Ramanathan et al., *J. Catal.* 95:249, 1985.
Smith et al., *J. Non-Cryst. Solids* 188:191, 1995.
Swain, *Oil & Gas J.* 1:62m 1993.
Topsoe, B. S. Clausen, F. E. Massoth, *Hydrotreating Catalysis* 157, 1996.
Vasudevan et al., *Appl. Catal.* 112:161, 1994.
Vrinat et al., *Bull. Soc. Chim. Belg.* 93:637, 1984.
Waldron et al., Sintering, Heyden, London, p. 62, 1978.
Wasielewski et al., *Proc 2nd Int. Conf Superalloys Processing*, TMS-AIME, Champion, Pa., pp. D-1-D-24, 1972.
Weisser et al., in "Sulphide Catalysts: Their Properties and Applications," Pergamon Press, New York, 1973.
Wilkinson et al., *J. Catal.* 171:325, 1997.
Zhang et al., *J. Catal.* 157:53, 1995.

What is claimed is:

1. A process for forming a carbon-containing molybdenum disulfide catalyst having a surface area larger than about 100 m$^2$/g, comprising:
   (a) adding an organic thiomolybdate salt precursor to a solution; and
   (b) decomposing the precursor under hydrothermal conditions to form a carbon-containing molybdenum disulfide catalyst.

2. The process of claim 1, wherein the precursor is selected from the group consisting of polyalkyl ammonium, polyalkyl, and organic diamine thiomolybdate.

3. The process of claim 1, further comprising:
   (c) impregnating the molybdenum disulfide catalyst with a promoter salt, wherein a promoted molybdenum disulfide catalyst is produced.

4. The process of claim 3, wherein the promoter salt is comprised of a metal selected from the group consisting of Co, Ni, Fe, and Ru.

5. The process of claim 3, further comprising:
   (d) activating the impregnated molybdenum disulfide catalyst under flowing H$_2$/H$_2$S and heat, wherein an activated, promoted molybdenum disulfide catalyst is produced.

6. The process of claim 5, wherein the activation occurs at temperatures between about 300° C. and about 400° C.

7. The process of claim 1, wherein the hydrothermal conditions constitute temperatures between about 250° C. and about 500° C. and pressures between about 100 psi and about 2000 psi.

8. The process of claim 7, wherein the temperatures are between about 300° C. and about 400° C.

9. The process of claim 7, wherein the pressures are between about 100 psi and about 1500 psi.

10. The process of claim 1, wherein the solution comprises a mixture of water and an organic solvent with a boiling point less than 200° C. under hydrothermal conditions.

11. The process of claim 10, wherein the solvent is selected from the group consisting of pentane, hexane, heptane, octane, nonane, and decane.

12. The process of claim 1, further comprising agitating or stirring the solution to facilitate the decomposition process.

13. A process for forming a promoted carbon-containing molybdenum disulfide catalyst having a surface area larger than about 100 m$^2$/g, comprising:
   (a) adding an organic thiomolybdate salt precursor to a solution;
   (b) decomposing the precursor under hydrothermal conditions to form a carbon-containing molybdenum disulfide catalyst; and
   (c) impregnating the molybdenum disulfide catalyst with a promoter salt.

14. The process of claim 13, wherein the precursor is selected from the group consisting of polyalkyl ammonium, polyalkyl, and organic diamine thiomolybdate.

15. The process of claim 13, wherein the promoter salt is comprised of a metal selected from the group consisting of Co, Ni, Fe, and Ru.

16. The process of claim 13, further comprising:
   (d) activating the impregnated molybdenum disulfide catalyst under flowing H$_2$/H$_2$S and heat, wherein an activated, promoted molybdenum disulfide catalyst is produced.

17. The process of claim 16, wherein the activation occurs at temperatures between about 300° C. and about 400° C.

18. The process of claim 13, wherein the hydrothermal conditions comprise temperatures between about 250° C. and about 500° C. and pressures between about 100 psi and about 2000 psi.

19. The process of claim 18, wherein the temperatures comprise between about 300° C. and about 400° C.

20. The process of claim 18, wherein the pressures comprise between about 100 psi and about 1500 psi.

21. The process of claim 13, wherein the solution comprises a mixture of water and an organic solvent with a boiling point less than 200° C. under hydrothermal conditions.

22. The process of claim 21, wherein the solvent is selected from the group consisting of pentane, hexane, heptane, octane, nonane, and decane.

23. The process of claim 13, further comprising agitating or stirring the solution.

* * * * *